(12) United States Patent
Wiklof

(10) Patent No.: US 6,345,765 B1
(45) Date of Patent: Feb. 12, 2002

(54) SPECTRAL SCANNER EMPLOYING LIGHT PATHS OF MULTIPLE WAVELENGTHS FOR SCANNING OBJECTS, SUCH AS BAR CODE SYMBOLS, AND ASSOCIATED METHOD

(75) Inventor: Christopher A. Wiklof, Everett, WA (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 09/608,999

(22) Filed: Jun. 30, 2000

(51) Int. Cl.[7] .................................. G06K 7/10
(52) U.S. Cl. ................... 235/472.01; 235/454; 235/469
(58) Field of Search ........................... 235/454, 472.01, 235/469

(56) References Cited

U.S. PATENT DOCUMENTS 4,658,147 A * 4/1987 Eldering ................ 235/462.41
5,468,950 A * 11/1995 Hanson ...................... 235/454

FOREIGN PATENT DOCUMENTS

EP  660616  * 12/1993

* cited by examiner

Primary Examiner—Harold I. Pitts
(74) Attorney, Agent, or Firm—Seed IP Law Group, PLLC

(57) ABSTRACT

An optical system, such as a bar code scanner, illuminates an image with a multi-wavelength device. Under a first embodiment, a tunable laser is optically coupled with a prism or other wavelength separation device. As the laser beam wavelength varies, the transmission path through the prism changes, resulting in a scanning of the beam across an image. A photodetector captures light reflected from the image and sends it to a microprocessor for decoding. Under another embodiment, a broad band light source transmits light through a prism, thus shining a "rainbow" on the image. A spectrometer measures reflected light as a function of wavelength and sends the resultant signal to a microprocessor for decoding. Neither embodiment relies on moving parts to scan the image.

43 Claims, 5 Drawing Sheets

SPECTRAL SCANNER EMPLOYING LIGHT PATHS OF MULTIPLE WAVELENGTHS FOR SCANNING OBJECTS, SUCH AS BAR CODE SYMBOLS, AND ASSOCIATED METHOD

TECHNICAL FIELD

This invention is generally related to imaging objects, such as machine-readable symbols or bar codes.

BACKGROUND OF THE INVENTION

A variety of methods exist for tracking and providing information about items. For example, inventory items typically carry printed labels providing information such as serial numbers, price, weight and size. Some labels include data carriers in the form of machine-readable symbols that can be selected from a variety of machine-readable symbologies, such as barcodes, area or matrix codes and stacked codes. The amount of information that the symbols can contain is typically limited by the space constraints of the label. These symbologies typically rely on patterns of light and dark symbol elements to encode data. For example, barcode symbologies employ patterns of alternating dark elements (e.g., bars) and light symbol elements (e.g., spaces). Information is encoded in the width of the alternating bars and spaces. The use of only two types of symbol elements (i.e., light and dark) limits the amount of information that can be encoded in a symbol of a given length (density).

Bar code readers typically fall into two classes: scanners and imagers Scanners typically employ a laser that sweeps through a field of view using mechanical beam defection devices and provide great depth of field. Mechanical beam deflection devices include dithering mirrors, rotating polygons and galvanometers, as well as other technologies to deflect the laser beam across the field of view. Imagers employ one- or two-dimensional arrays of photodetectors to effectively produce a one-or two-dimensional image of the field of view. Imagers employing photodetector arrays typically project monochrome light on an image surface, where the photodetector array receives light reflected therefrom.

Unfortunately, laser scanners are large in size, heavy and suffer from poor shock resistance. Furthermore, laser scanners suffer from poor reliability, low life, high power consumption and vulnerability to vibration, primarily due to the laser and laser scanning components, including the mechanical devices used to scan the laser beam across the field of view. To maximize the depth of field for imagers or other photodetector array readers, small effective apertures must be used. However, small effective apertures significantly limit the overall efficiency of these readers and result in increased power consumption, greater weight and larger size than is desirable.

BRIEF DESCRIPTION OF THE DRAWINGS

In the drawings, identical reference numbers identify similar elements or acts. The sizes and relative positions of elements in the drawings are not necessarily drawn to scale. For example, the shapes of various optical elements and angles of the illustrated light beams are not drawn to scale and these elements are arbitrarily enlarged and positioned to improve drawing legibility. Further, the particular shapes of the optical elements as drawn are not necessarily the actual shapes of the optical elements, but are rendered for ease of recognition in the figures.

To easily identify the discussion of any particular element, the most significant digit or digits in a reference number refer to the Figure number in which that element is first introduced (e.g., element 304 is first introduced and discussed with respect to FIG. 3). The headings provided herein are for convenience only and do not affect the scope or meaning of the claimed invention.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with symbol readers, decoders, optics, image sensors and microprocessors have not been shown or described in detail to avoid unnecessarily obscuring descriptions of the embodiments of the invention.

Aspects of the invention are directed to a reader for reading or imaging objects such as machine-readable symbols or media storing data. The reader includes a light source, a wavelength separation device, at least one light detector and a processor. The light source produces light having several wavelengths, while the wavelength separation device, such as a prism, is positioned and configured to receive the light from the light source and produce multiple paths of light based on the wavelengths of the light. The paths of light impinge on an object such as a bar code symbol. The light detector is positioned and configured to receive light reflected from the symbol and produce an output symbol based on the light reflected from the symbol. The processor is coupled to the light source and the light detector. The processor receives the output signal from the light detector and analyzes the signal based on the output signal to, for example, decode the symbol.

In one embodiment, the light source is a tunable laser that provides a laser beam having several wavelengths based on an input signal. The prism deflects the laser beam along the numerous paths of light based on the wavelengths of the laser beam. In another embodiment, the light source is a broad band light source that produces light over a range of wavelengths. The light detector is a spectrometer. The prism is configured to, or the reader includes additional optics to, align adjacent bands of light having different wavelengths on the symbol, which are received by the spectrometer.

Symbol Reader Having Tunable Laser Light Source

Figure 1:
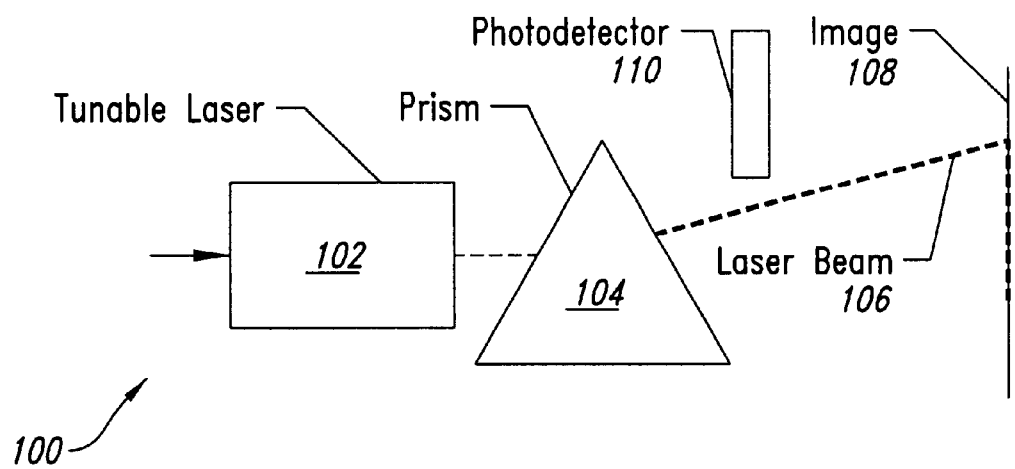
FIG. 1 is a partial schematic, partial block diagram of a laser scanner under a first embodiment of the invention.

Referring to FIG. 1, a first embodiment of the invention is shown as an imager or scanner 100 having a tunable laser 102. Tunable lasers have the ability to vary the wavelength of their output laser beam depending upon a varying input signal. Tunable lasers are available from manufacturers such as Melles Griot, Spectra Physics, Quantel, and Linos Photonics, Ltd.

Figure 2:
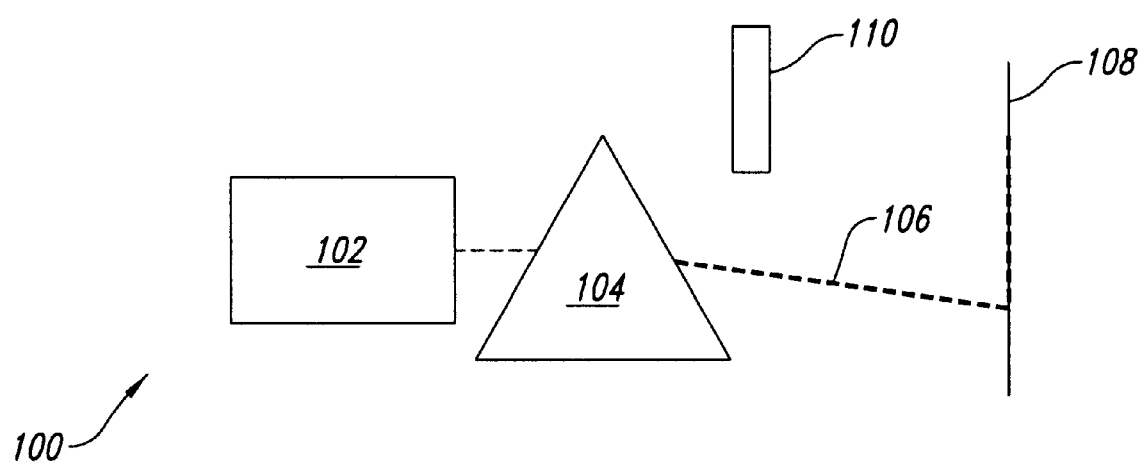
FIG. 2 is a partial schematic, partial block diagram of the laser scanner under the first embodiment, showing the laser beam deflected by a prism based on a different laser beam wavelength.

The tunable laser 102 projects a laser beam 106 through a wavelength separation device, such as a prism 104. Depending upon the wavelength of the laser beam, the prism 104 defracts the laser beam 106 along different defraction angles, which can be seen by visually comparing FIG. 1 to FIG. 2. For example, the tunable laser 102 in FIG. 1 outputs a red laser beam of approximately 680 nanometers (nm) while, in response to a different input signal, the tunable laser in FIG. 2 outputs an amber laser beam of approximately 580 nanometers. The prism 104 deflects the laser beam 106 on two different defraction angles based on the 680 nm and 580 nm beam wavelengths. Of course, the tunable laser 102 may provide continuous tuning or range between predetermined wavelengths, such as 680 and 580 mn, to thereby sweep the laser beam 106 across a field of view or image 108. A photodetector 110 then receives light reflected from the image 108, as is standard in laser scanner devices. The photodetector 110 is chosen to have approximately equal sensitivity across the wavelength range of the laser beams 106 produced by the tunable laser 102.

Figure 3:
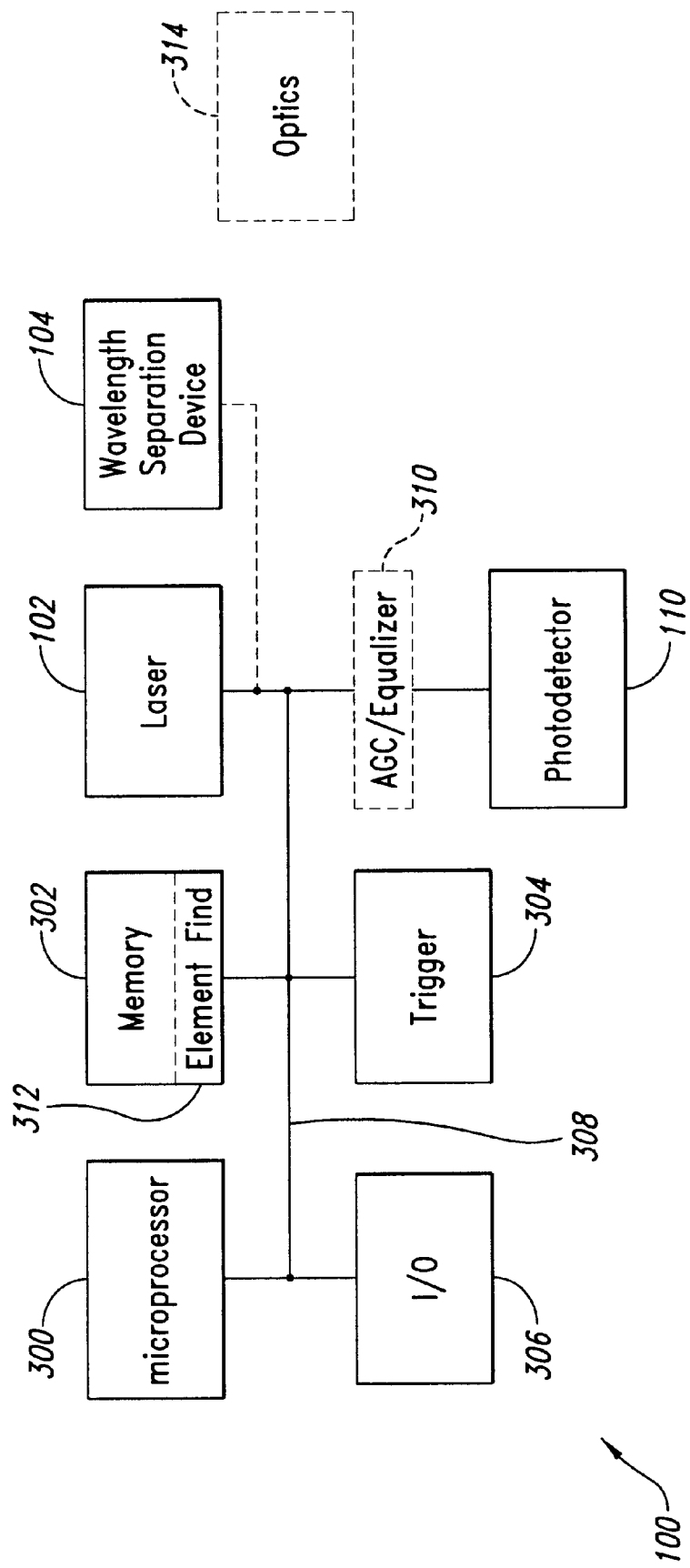
FIG. 3 is a block diagram of the laser scanner of FIG. 1.

Referring to FIG. 3, a block diagram of the scanner 100 shows the laser 102 and photodetector 110 coupled to a microprocessor 300, memory 302, trigger switch 304 and input/output devices 306. The laser, photodetector, microprocessor, memory, trigger, and input/output devices may be coupled together by a bus 308. The microprocessor 300 may be any logic processing unit, such as one or more central processing units (CPUs), digital signal processors (DSPs), application specific integrated circuits (ASIC), and the like. While the microprocessor 300, memory 302, photodetector 110, laser 102 and other components of the scanner 100, are shown as separate blocks, some or all of these blocks can be monolithically integrated onto a single chip.

The input/output devices 306 can include one or more input buttons, such as a keypad, that may be used to manually input data to the scanner 100. Additional input devices can include a cable port to which a cable may be mechanically and electrically secured to the scanner 100 to permit data exchange therewith. Output devices include audible output devices such as speakers or beepers, and visual output devices such as display screens. Additional input/output devices that may be employed by the scanner 100 include a wireless transceiver, data storage readers for machine-readable storage devices (e.g., floppy, fixed, or optical disks, PCMCIA cards, and the like). Except for the trigger 304 and possibly input/output devices 306, the scanner 100 lacks moving parts. Importantly, no dithering mirrors, rotating polygonal prisms, and the like, are employed by the laser 102.

Unless described otherwise below, the construction and operation of the various blocks shown in FIG. 3 are of conventional design. As a result, such blocks need not be described in further detail herein, as they will be understood by those skilled in the relevant art. Such further detail is omitted for brevity and so as to not obscure the detailed description of the invention. Any modifications necessary to the blocks of the scanner 100 in FIG. 3 (or other embodiments) can be readily made by one skilled in the relevant art based on the detailed description provided herein.

By actuating the trigger 304, the microprocessor 300 causes the laser 102 to output a laser beam of differing wavelengths, extending between two end points of the predefined wavelength range. The photodetector 110 then receives the light reflected from the image 108 and converts the light to an electrical signal. The microprocessor 300 receives the electrical signal directly and decodes it, or the electrical signal is stored in the memory 302 for later analysis by the microprocessor.

Most bar codes and other machine-readable symbologies are printed with black inks on white paper. Blacks inks and white paper typically maintain high contrast across a relatively broad spectral band. Thus, light over a broad range of wavelengths provides sufficiently similar reflectances from both the white paper and the black ink. For example, carbon based inks are particularly spectrally insensitive, and thus provide substantially similar responses for reflected light over a range of wavelengths for light projected thereto. While the wavelength of the laser beam 106 may vary, the reflected light from the image 108 does not substantially vary over the predetermined wavelength range. The predetermined wavelength range for the tunable laser 102 can be chosen to avoid spectral sensitivity effects of particular inks and paper (or other marking materials and substrates) used for the image 108 so that a relatively flat response versus wavelength results. Alternatively, the type of ink used or substrate on which the ink is applied may be varied to provide a flat response based on a predetermined wavelength range for the laser beam 106.

An optional automatical gain control circuit (AGC) or equalizer 310 normalizes the output from the photodetector 110 across the predetermined wavelength range. For example, the tunable laser 102 may provide different output over the range of wavelengths; likewise, the photodetector 110 may provide differing outputs based on light received over the range of wavelengths. Furthermore, color variation across the image 108 may produce differing reflected light over the range of wavelengths. The equalizer 310 assumes a nominally white background and adjusts the scan reflectance profile signal produced by the photodetector 110 to mimic that generated by a monochrome scanner. Thus, if the photodetector 110 produces an input profile that decreases in amplitude or rolls off as the wavelength range approaches 580 nanometers, the equalizer 310 amplifies or boosts the profile signal in an opposite or converse way to produce a generally flat or normalized output signal. While an AGC or equalizer circuit are described, various other circuits or methods for producing a normalized output signal are available, as those skilled in the relevant art will recognize.

Alternatively, or in addition to the equalizer 310, the scanner 100 may employ an element finding of subroutines 312, shown stored in the memory 302. Examples of element finding subroutines 312 include edge inflection point, local mean edge transition level and centers methods. Edge inflection point methods refer to those profile analysis subroutines that identify an inflection point between peaks and valleys in the photodetector's output signal or "profile" as edges between adjacent elements (e.g., between a bar and a space). Local mean edge transition level methods refer to identifying a darkest part or valley for a bar and a lightest part or peak of an adjacent space in a profile and identifying a position half way therebetween in the profile as an edge between the bar and space. Centers methods refer to element finding subroutines that identify centers of peaks and valleys in a profile as centers of spaces and bars of a bar code symbol or other machine-readable symbology.

Any known subroutines employing edge inflection point, local mean edge transition level, centers methods, or other methods, may be employed to enhance or improve decodability of profiles produced by the photodetector 110. For example, U.S. Pat. No. 5,877,486, assigned to the assignee of this invention, describes other methods of enhancing reflectance profiles that may be employed by the scanner 100. In general, the scanner 100 need not obtain a perfect profile or stored image of a bar code because the microprocessor 300 has prior knowledge of the bar code structure and an ideal profile produced therefrom. Thus, various wave shaping and other profile enhancement techniques may be employed.

While a prism 104 is shown as the wavelength separation device, other wavelength separation devices may be used, such as interference based optics, holographic lens elements, other transmissive or reflective optics, or acousto-optic modulators (AOMs). AOMs use acoustically driven defraction of light in a propagation medium to steer the laser beam 106 onto the image 108. The laser beam 106 passes through a cell in which ultrasound waves are generated in a direction roughly orthogonal to beam travel. These pressure waves act as a defraction grating that refracts the laser beam 106 at an angle proportional to the wavelength of the beam and frequency of the sound wave. When the ultrasound transducer is turned off, the laser beam 106 is allowed to pass through the AOM unhindered, but when the transducer is energized, the beam is defracted in the direction of sound propagation (or opposite thereto). To improve an angle of deflection for the laser beam 106, the microprocessor 300 (or other circuitry not shown) can provide a varying signal to the AOM to further defract the laser beam over the predetermined range of wavelengths.

Optional optics 314 can be provided to further direct the laser beam 106, or to shape the laser beam or light reflected from the image 108. The optics 314 may be as simple as an aperture, or may include complex lens systems to gather, collimate and focus light, for example, from the image 108 to the photodetector 110. Additional optics can include beam splitters, filters (e.g., color and/or polarization filters), apertures and additional focusing optics.

Figure 4:
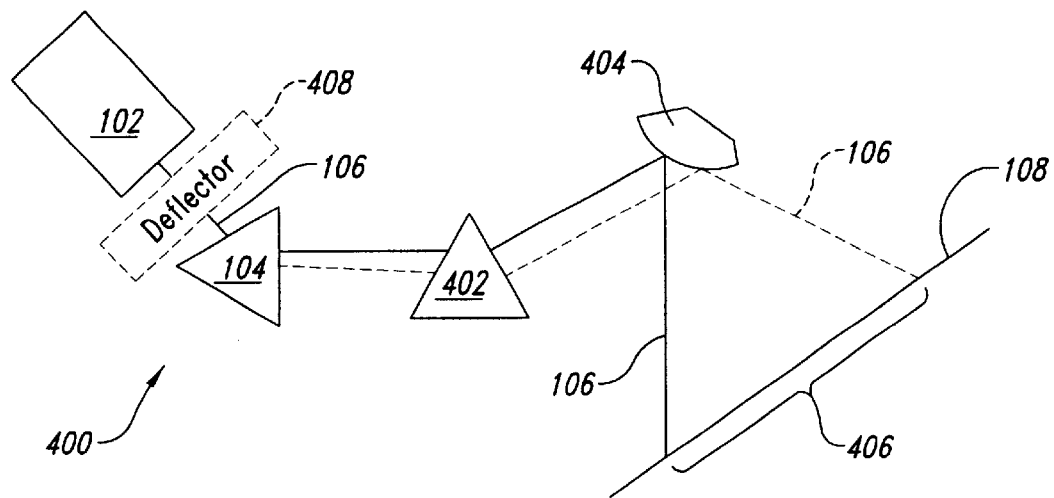
FIG. 4 is a partial schematic, partial block diagram of an alternative embodiment to the laser scanner of FIG. 1, showing additional optical components.

Referring to FIG. 4, a laser scanner 400 according to an alternative embodiment employs additional optics to spread the scanning length of the laser beam 106. In general, alternatives and alternative embodiments described herein are substantially similar to previously described embodiments, and common elements or functions are identified by the same reference numbers. Only significant differences in construction or operation are described in detail.

The laser beam 106 extends through the prism 104 and then through a second prism 402 that further spreads and defines end points for the scanning path of the laser beam over the predetermined range of wavelengths. A convex reflector 404, such as an arc length of a tubular mirror further spreads the scanning range for the laser beam 106. By employing the second prism 402 and the convex reflector 404, the scanner 100 can produce a wide scanning path (shown by a distance 406) that can be substantially wider for a given predetermined wavelength range than the scanner 100 of FIG. 1. Of course, other optics may be employed to spread the laser beam 106 and provide a scanning path, such as lens systems.

The laser scanner 400 may include a vertical deflector 408 to permit the scanner to scan in a direction perpendicular to that provided by the optics, to thereby scan a two dimensional area. Any known vertical deflector may be used, such as dithering mirrors and the like used in typical laser scanners. As a result, by employing such a vertical deflector, the laser scanner 400 can scan two-dimensional symbols, such as stacked or matrix symbols (e.g., PDF 417).

Symbol Reader Having Broad Band Illumination Source and Spectrometer

Figure 5:
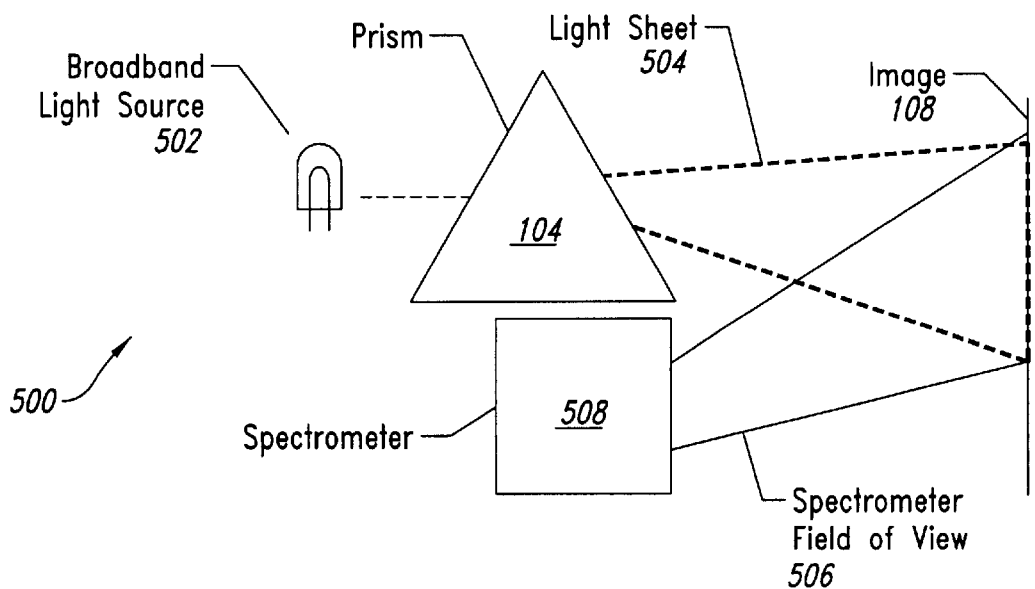
FIG. 5 is a partial schematic, partial block diagram of an imaging device under a second embodiment of the invention.

Referring to FIG. 5, a second alternative embodiment shown as an imager 500 employs a broad band light source 502. The output of the broad band light source 502 is spectrally varied by the prism 104 to project light of a range of wavelengths onto the image 108. Thus, if the broad band light source 502 were a white light source, then the prism 104 produces a sheet of light 504 as a rainbow extending across the image 108. Importantly, the prism 104 and other optics (not shown) project the sheet of light 504 to extend in a direction along the image 108 whereby the wavelength varies along the sheet of light in the same direction in which data is encoded in the image.

Figure 6:
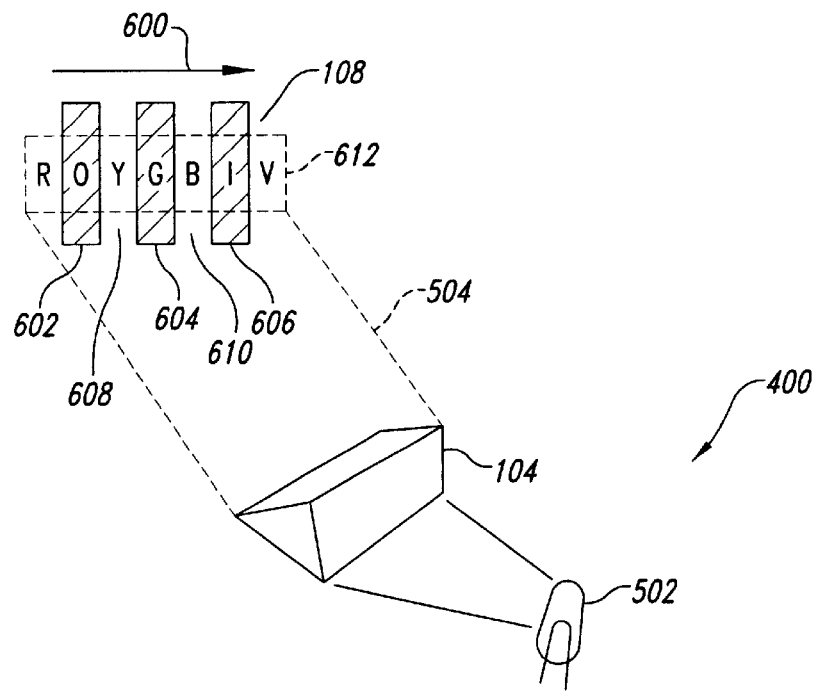
FIG. 6 is a partial isometric, partial schematic diagram of a sheet of light projected onto an image by the device of FIG. 5.

Referring to FIG. 6, the image 108 is shown as a bar code symbol having information encoded in a direction indicated by an arrow 600. The bar code symbol includes three bars 602, 604 and 606, with spaces 608 and 610. The light sheet 504 projects a rectangular illumination field 612 onto the bar code symbol. As shown in FIG. 6, the broad band light source 502, prism 104 and suitable optics, such as a slit aperture (not shown) produce a rainbow pattern in the rectangular field 612 extending in the direction 600 to produce bands of color: red, orange, yellow, green, blue, indigo and violet, represented by letters R, O, Y, G, B, I and V, respectively in FIG. 6. The optics of the imager 400, together with possibly a human operator, align the wavelength bands in the rectangular field 612 with the bars and spaces of the symbol. As shown in FIG. 6, the red and violet bands illuminate the left and right quiet zones, the orange, green and indigo bands illuminate the bars 602, 604 and 606, while the yellow and blue bands illuminate the spaces 608 and 610, all respectively. Of course, the bar code symbol, bands of light and arrangement of FIG. 6 are of illustrative purposes only; in actual implementations, bar code symbols typically have greater numbers of bars and spaces, the wavelength bands in the rectangular field 612 have finer gradations (not just colors R, O, Y, G, B, I and V), alignment of bands with respect to elements of the symbol may be slightly off with respect to the direction 600, and so forth.

Referring back to FIG. 5, a spectrometer 508 receives light reflected from the image 108. The spectrometer 508 has a field of view 506 that captures all information stored within the image 108 and much or all of the light within the rectangular field 612. The spectrometer 508 must have a field of view 506 that receives reflected light from each information bearing element in the image 108, where each information bearing element is illuminated by a separate wavelength of light from other information bearing elements. Thus, for the simplified example of FIG. 6, the spectrometer 508, in conjunction with the microprocessor 300, distinguishes between the wavelengths of light for the red, orange, yellow, green, blue, indigo and violet wavelengths, and the amount or intensity of light reflected for each wavelength, to thereby identify bars from spaces and widths of such elements. Consequently, the prism 104 or other wavelength separation device, together with suitable optics, separates light from the broad band light source 502 into its component wavelengths, where component wavelengths are projected onto the image 108 and each vertical position on the image is characterized by a particular wavelength. The field of view 506 of the spectrometer 508 is approximately coincident with the sheet of light 504, and each wavelength reflected to the spectrometer is a greater or lesser extent a function of the printed density of the image 108. The spectrometer 508 outputs a signal similar to a profile (assuming the image 108 is a bar code symbol), where peaks represent spaces and valleys represent bars in the symbol. The microprocessor 300 then decodes information in the image 108 from the profile using known techniques.

Figure 7:
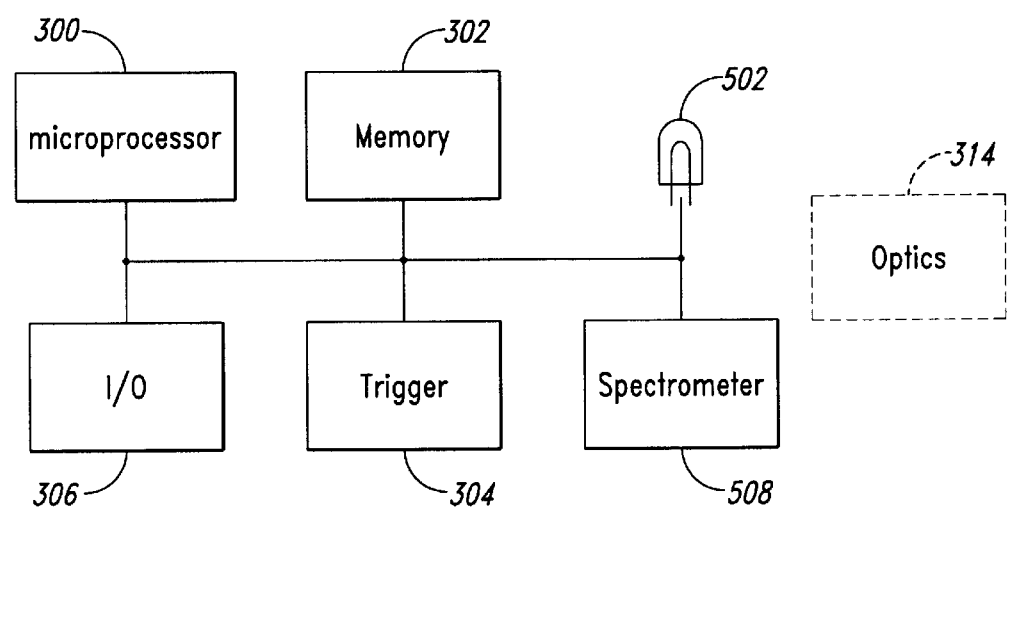
FIG. 7 is a block diagram of the device of FIG. 5.

Referring to FIG. 7, a block diagram of the imager 500 is similar to the block diagram of the scanner 100. As with the laser scanner, many components of the imager 500 are monolithically integrated individually, or together, such as the spectrometer 508 being monolithically integrated with the microprocessor 300 and/or the memory 302. Suitable spectrometers include those manufactured by Analytical Solutions and MicroParts. Many spectrometers use a prism to separate constituent wavelengths of received light and a linear photodetector to determine the intensity of each wavelength. The light source 502 may be any suitable light source having an appropriate range of wavelengths, such as those described above for the scanner 100.

The optics 314 in the imager 500 can include a lens or other optical element to converge received light in the field of view 506 to a coincident location in the spectrometer 508. For example, any condensing lens system may be used, including a cylindrical lens and a slit aperture to focus a generally rectangular field of view 506 onto a linear array of photodetectors in the spectrometer 508.

Figure 8:
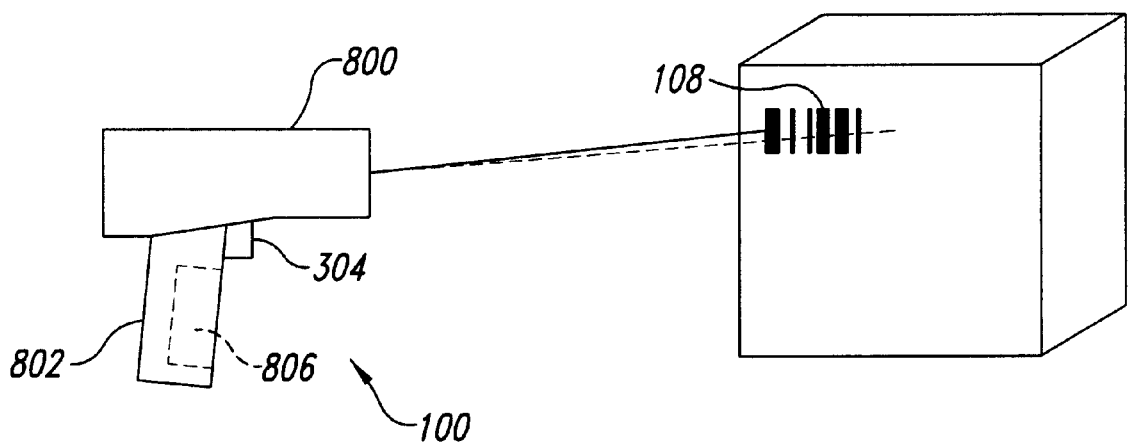
FIG. 8 is a schematic diagram of the laser scanner of FIG. 1 in a hand-held application.

Referring to FIG. 8, a housing 800 encloses the scanner 100 to thereby make the scanner hand-held and portable. The housing 800 includes a handle 802 and a portable power supply 806, such as rechargeable batteries. The scanner 100, of course, can also be employed in a fixed-mount application such as point of sale terminals, over-the-belt package conveyor applications, etc.

Figure 9:
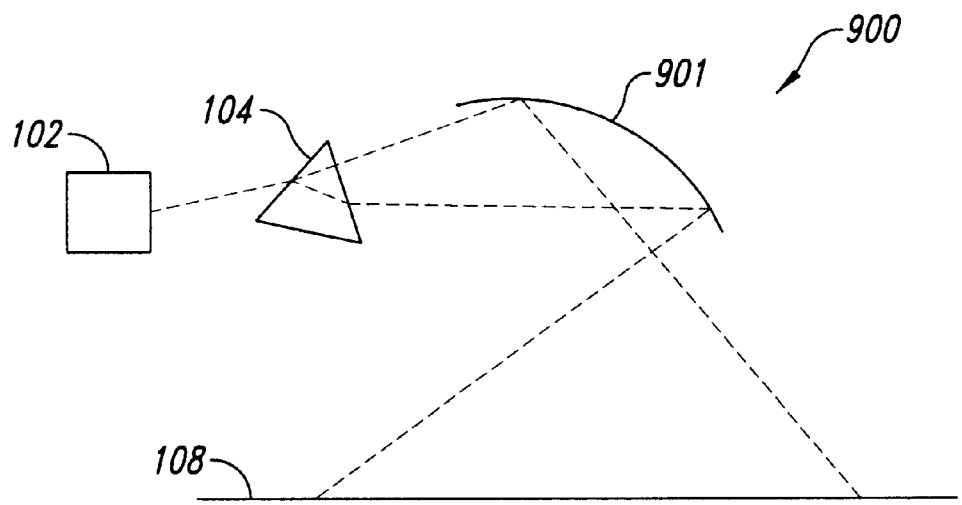
FIG. 9 is a partial schematic, partial block diagram of an alternative embodiment of the invention.

FIG. 9 shows an example of a folded optical path for increasing beam deflection angle. As shown, a scanner 900 includes a concave mirror or reflective element 901 that assists the laser beam from the tunable laser 102 to extend through a greater deflection angle.

The above description of illustrated embodiments of the invention is not intended to be exhaustive or to limit the invention to the precise form disclosed. Although specific embodiments of and examples for the reader and optical system are described herein for illustrative purposes, various equivalent modifications can be made without departing from the spirit and scope of the invention, as will be recognized by those skilled in the relevant art. The teachings provided herein of the invention can be applied to imagers for any object, not necessarily the illustrated bar code readers generally described above.

The various embodiments described above can be combined to provide further embodiments. All of the above U.S. patents referred to above are incorporated by reference. Aspects of the invention can be modified, if necessary, to employ systems, circuits and concepts of the patents to provide yet further embodiments of the invention.

These and other changes can be made to the invention in light of the above description. In general, in the following claims, the terms used should not be construed to limit the invention to the specific embodiments disclosed in the specification and the claims, but should be construed to include all optical systems that operate in accordance with the claims to optically scan or illuminate information bearing objects. Accordingly, the invention is not limited by the disclosure, but instead its scope is to be determined entirely by the following claims.

What is claimed is:

1. A reader for reading a bar code symbol, comprising:
    a housing;
    a light source at least partially retained by the housing and projecting light of a plurality of wavelengths therefrom;
    a prism positioned with respect to the housing to receive the light from the light source and produce a plurality of paths of light based on the plurality of wavelengths of the light, wherein the plurality of paths of light impinge on the bar code symbol external to the housing;
    at least one light detector secured to the housing that receives light reflected from the bar code symbol and produces an output signal based on the light reflected from the bar code symbol, wherein the light reflected from the bar code symbol represents bars and spaces in the bar code symbol and the plurality of wavelengths of the light; and
    a microprocessor coupled to the light source and the light detector that receives the output signal from the light detector and decodes the bar code symbol based on the output signal.

2. The reader of claim 1 wherein the light source is a tunable laser that provides a laser beam having a plurality of wavelengths ranging from amber to red colors based on an input signal produced by the reader, and wherein the prism deflects the laser beam along the plurality of paths of light based on the plurality of wavelengths of the laser beam, and
    wherein the reader includes an automatic gain control circuit coupled to the light detector and the microprocessor, wherein the control circuit automatically normalizes the output signal despite fluctuations in the output signal based on differences in output verses wavelength for the tunable laser or light detector.

3. The reader of claim 1 wherein the photodetector is a spectrometer, wherein the light source is a broadband light source that produces light over a range of wavelengths, and wherein the prism is configured or includes optics to produce adjacent bands of light having different wavelengths, wherein each band is approximately alignable to be coincident with one of the bars or spaces of the bar code symbol.

4. The reader of claim 1 wherein the housing is sized and configured to be hand-held and wherein the reader includes a trigger switch secured to the housing, coupled to the microprocessor and configured to activate the reader upon actuation thereof.

5. A reader for reading a symbol, comprising:
    a light source producing light of a plurality of wavelengths;
    a wavelength separation device positioned and configured to receive the light from the light source and produce a plurality of paths of light based on the plurality of wavelengths of the light, wherein the plurality of paths of light impinge on the symbol;
    at least one light detector positioned and configured to receive light reflected from the symbol and produce an output signal based on the light reflected from the symbol; and
    a processor coupled to the light source and coupled to the light detector, wherein the processor receives the output signal from the light detector and analyzes the symbol based on the output signal.

6. The reader of claim 5 wherein the light source is a tunable laser that provides a laser beam having a plurality of wavelengths based on an input signal, and wherein the wavelength separation device deflects the laser beam along the plurality of paths of light based on the plurality of wavelengths of the laser beam.

7. The reader of claim 5, further comprising an automatic gain control circuit coupled to the light detector and the processor, wherein the control circuit automatically adjusts the output signal despite fluctuations in the output signal based on differences in output verses wavelength for the light source or the light detector.

8. The reader of claim 5 wherein the light source is a tunable laser that provides a laser beam having a plurality of wavelengths based on an input signal produced by the reader, and wherein the wavelength separation device is a plurality of prisms constructed and positioned in a cascaded arrangement to deflect the light along the plurality of paths of light based on the plurality of wavelengths of the laser beam.

9. The reader of claim 5 wherein the light source is a tunable laser that provides a laser beam having a plurality of wavelengths based on an input signal, and wherein the wavelength separation device is an acousto-optic modulator coupled to the processor that deflects the laser beam along the plurality of paths of light based on the plurality of wavelengths of the laser beam.

10. The reader of claim 5 wherein the light detector is a spectrometer.

11. The reader of claim 5 wherein the light source is a broadband light source that produces light over a range of wavelengths, and wherein the reader includes optics configured to produce adjacent bands of light having different wavelengths.

12. The reader of claim 5 wherein the light source is a broadband light source that produces light over a range of wavelengths, and wherein the apparatus includes a filter that produces light having a plurality of wavelengths ranging from amber to red colors.

13. The reader of claim 5, further comprising optics to direct the plurality of paths of light along a first axis with respect to the symbol, and wherein the reader further comprises a light deflector to deflect the paths of light along a second axis differing from the first axis.

14. The reader of claim 5 wherein the symbol is a machine-readable symbol having a plurality of elements encoding information, and wherein the processor is configured to find elements in the symbol based on the output signal to identify and decode the information encoded by the elements of the symbol.

15. The reader of claim 5 wherein the symbol is a machine-readable symbol having a plurality of elements encoding information, and wherein the processor is configured to process the output signal to enhance identification of the elements of the symbol within the output signal.

16. The reader of claim 5, further comprising a housing is sized and configured to be hand-held and wherein the reader includes a trigger switch secured to the housing, coupled to the processor and configured to activate the reader upon actuation thereof.

17. The reader of claim 5 wherein the light source is a tunable laser, and wherein the reader further comprises a beam deflection optical element configured to provide a folded optical path for a laser beam produced by the tunable laser.

18. An apparatus for imaging a symbol, comprising:
a light source producing light of a plurality of wavelengths;
a wavelength separation device positioned and configured to receive the light from the light source and produce a plurality of paths of light based on the plurality of wavelengths of the light, wherein the plurality of paths of light impinge on the symbol; and
at least one light detector positioned and configured to receive light reflected from the symbol and produce an output signal based on the light reflected from the symbol.

19. The apparatus of claim 18 wherein the light source is a tunable laser that provides a laser beam having a plurality of wavelengths based on an input signal and wherein the wavelength separation device deflects the laser beam along the plurality of paths of light based on the plurality of wavelengths of the laser beam.

20. The apparatus of claim 18, further comprising an automatic gain control circuit coupled to the light detector, wherein the control circuit automatically adjusts the output signal despite fluctuations in the output signal based on differences in output verses wavelength for the light source or the light detector.

21. The apparatus of claim 18 wherein the light source is a tunable laser that provides a laser beam having a plurality of wavelengths based on an input signal produced by the apparatus, and wherein the wavelength separation device is a plurality of prisms constructed and positioned in a cascaded arrangement to deflect the light along the plurality of paths of light based on the plurality of wavelengths of the laser beam.

22. The apparatus of claim 18 wherein the light source is a tunable laser that provides a laser beam having a plurality of wavelengths based on an input signal, and wherein the wavelength separation device is an acousto-optic modulator that deflects the laser beam along the plurality of paths of light based on the plurality of wavelengths of the laser beam.

23. The apparatus of claim 18 wherein the light detector is a spectrometer.

24. The apparatus of claim 18 wherein the light source is a broadband light source that produces light over a range of wavelengths, and wherein the apparatus includes optics configured to produce adjacent bands of light having different wavelengths.

25. The apparatus of claim 18 wherein the light source is a broadband light source that produces light over a range of wavelengths, and wherein the apparatus includes a filter that produces light having a plurality of wavelengths ranging from amber to red colors.

26. The apparatus of claim 18, further comprising optics to direct the plurality of paths of light along a first axis with respect to the symbol, and wherein the apparatus further comprises a light deflector to deflect the paths of light along a second axis differing from the first axis.

27. A method of reading a machine-readable symbol representing encoded information, the method comprising:
producing light of a plurality of wavelengths;
projecting a plurality of paths of light based on the plurality of wavelengths of the light, wherein the plurality of paths of light project onto the symbol;
producing an output signal based on the plurality of wavelengths of the light reflected from the symbol; and
decoding the symbol based on the output signal.

28. The method of claim 27 wherein producing light includes producing a laser beam having a plurality of wavelengths changeable based on an input signal.

29. The method of claim 27, further comprising automatically normalizing the output signal despite fluctuations in the output signal based on differences in output verses wavelength for the light.

30. The method of claim 27 wherein the symbol is a machine-readable symbol having a plurality of elements encoding information, and wherein the method further comprises finding elements in the symbol based on the output signal to identify and decode the information encoded by the elements of the symbol.

31. The method of claim 27 wherein the symbol is a machine-readable symbol having a plurality of elements encoding information, and wherein the method further comprises process enhancing identification of the elements of the symbol within the output signal.

32. The method of claim 27 wherein producing an output signal includes measuring an intensity of each wavelength of light reflected from the symbol.

33. The method of claim 27 wherein producing light includes producing broadband light over a range of wavelengths, and wherein projecting includes projecting adjacent bands of light having different wavelengths on the symbol.

34. The method of claim 27 wherein projecting includes directing the plurality of paths of light along a first axis with respect to the symbol, and wherein the method further comprises deflecting the paths of light along a second axis differing from the first axis.

35. The method of claim 27, further comprising folding the produced light.

36. A method of imaging an object, the method comprising:
  producing light of a plurality of wavelengths;
  projecting a plurality of paths of light based on the plurality of wavelengths of the light, wherein the plurality of paths of light project onto the object;
  producing an output signal based on the plurality of wavelengths of the light reflected from the symbol; and
  analyzing the object based on the output signal.

37. The method of claim 36 wherein producing light includes producing a laser beam having a plurality of wavelengths changeable based on an input signal.

38. The method of claim 36, further comprising automatically normalizing the output signal despite fluctuations in the output signal based on differences in output verses wavelength for the light.

39. The method of claim 36 wherein the object is a machine-readable symbol having a plurality of elements encoding information, and wherein the method further comprises finding elements in the symbol based on the output signal to identify and decode the information encoded by the elements of the symbol.

40. The method of claim 36 wherein producing an output signal includes measuring an intensity of each wavelength of light reflected from the object.

41. The method of claim 36 wherein producing light includes producing broadband light over a range of wavelengths, and wherein projecting includes projecting adjacent bands of light having different wavelengths on the object.

42. The method of claim 36 wherein projecting includes directing the plurality of paths of light along a first axis with respect to the object, and wherein the method further comprises deflecting the paths of light along a second axis differing from the first axis.

43. The method of claim 36, further comprising providing a folded optical path for the produced light.

* * * * *